Oct. 16, 1951     E. P. NEHER     2,571,281
RESILIENT MOUNTING
Filed Sept. 13, 1947

INVENTOR
Eldon Paul Neher
BY Evans & McCoy
ATTORNEYS

Patented Oct. 16, 1951

2,571,281

UNITED STATES PATENT OFFICE 2,571,281

RESILIENT MOUNTING

Eldon Paul Neher, North Manchester, Ind., assignor to The General Tire and Rubber Company, Akron, Ohio, a corporation of Ohio Application September 13, 1947, Serial No. 773,844

11 Claims. (Cl. 248—358)

1

This invention is a continuation-in-part of my application Serial No. 614,762, filed September 6, 1945 and issued as U. S. Patent 2,457,706, December 28, 1948, and relates to vibration-insulating mountings having simplified construction and freedom of movement in several directions.

It is an object of the present invention to provide a mounting which is of relatively low cost and which has characteristics that permit more effective isolation of vibrations in vibrating machinery.

It is another object of the present invention to provide a mounting for vibrating machinery and the like which utilizes a rubberlike material for vibration insulation and which may be easily produced without the necessity of vulcanizing the rubberlike material to metal.

Other objects will be apparent from the following description of the invention as illustrated by the accompanying drawing, in which.

Figure 1:
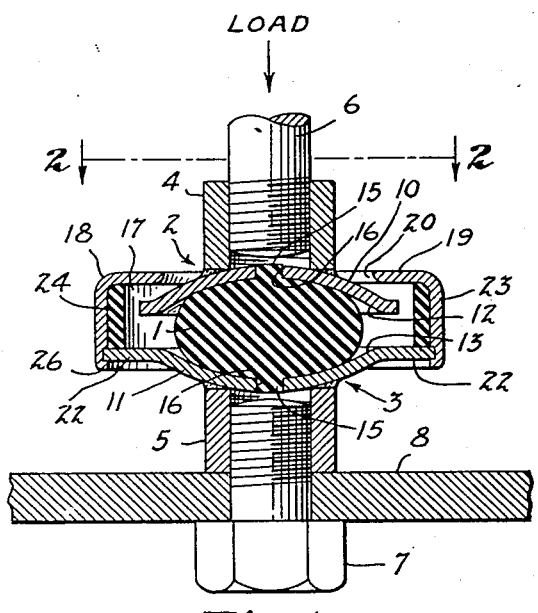
Figure 1 is a vertical section through a mounting embodying the present invention.

Referring more particularly to the drawing, wherein like parts are designated by like numerals of reference throughout the several views, the vibration-insulating mountings of the present invention have a main load-sustaining resilient member 1, preferably a block having a spheroidally curved surface as has a ball or sphere of vulcanized resilient or rubberlike material, such for example as a vulcanized, soft rubber compound. The resilient member 1 has disposed on each of two opposite sides thereof a rigid connecting member, one of which (2) is adapted to be connected to a mounted member and the other of which (3) is adapted to be connected to a mounting member, such as a base 8.

The rigid connecting members 2 and 3 respectively have connecting means 4 and 5, which

2 may be of tubular shape and are internally threaded to receive bolts 6 and 7, which are adapted to fasten the connecting means 4 and 5 respectively to the mounted member (not shown) and the base or mounting member 8. The rigid connecting members 2 and 3 have at one end of the connecting means 4 or 5 transverse or disclike portions 10 and 11 of different diameters and having relatively wide transversely extending bearing surfaces 12 and 13, respectively, of greater diameter than the diameter of the attaching means. The bearing surfaces 12 and 13 are preferably concave and respectively bear against opposite spheroidal surfaces of the resilient member 1.

The radius of curvature of the bearing surfaces 12 and 13 is preferably substantially greater than the radius of curvature of the resilient load-sustaining member 1 when the latter is in the undeformed or separately molded condition. The projected area of the bearing surface is preferably substantially greater than the projected area of the block 1 thereon when the latter is either in the normally loaded or initially molded state, so that the load deflection characteristic of the mounting is a curve showing less deflection per unit of load or the degree of deflection is increased and so that rolling of the member 1 may be relatively freely accomplished by side thrust or forces tending to cause movements of the mounted or mounting members relative to each other in directions relatively parallel to the general plane of the bearing surfaces 12 and 13.

Means such as a lug on one of the contacting members and a cooperating recess in the other of the contacting members are provided at each of the bearing surfaces for initially locating the resilient member with respect to the central portion of the bearing surfaces. Thus, a lug 15 may be provided on each of two diametrically opposite portions of the resilient member or block 1 and a recess or opening 16 may be provided in each of the bearing surfaces 12 and 13, preferably at the central portion thereof. This locating means together with the convex curvature of the bearing surfaces gives stability to the mountings.

Locking means having an inwardly directed channel 17 is provided to limit the maximum separation of the bearing surfaces so as to preferably maintain the resilient member 1 (or 1A if a fluid filled member is used) under compression between the bearing surfaces. The locking or flanged retaining member 18, carried by peripheral portions of the transverse portion 11 having greatest diameter, and having an inwardly directed annular flange 19, with an opening 20 therein, of less diameter than the maximum diameter of the smaller transverse or disc-like portion 10 carrying the bearing surface 12, but of substantially larger diameter than the connecting means or tubular portion 4 of the member 2.

The inwardly directed flange 19 and the axially extending side portion of the cup-shaped element 18 of the locking means cooperate with extended portions 22 of the transverse portion 11 to form the annular channel 17. The length of the axially extending side portion 23 combined with the characteristics of the resilient member 1 largely determines the permissible movement of the mounted and mounting members toward and away from each other.

Figure 4:
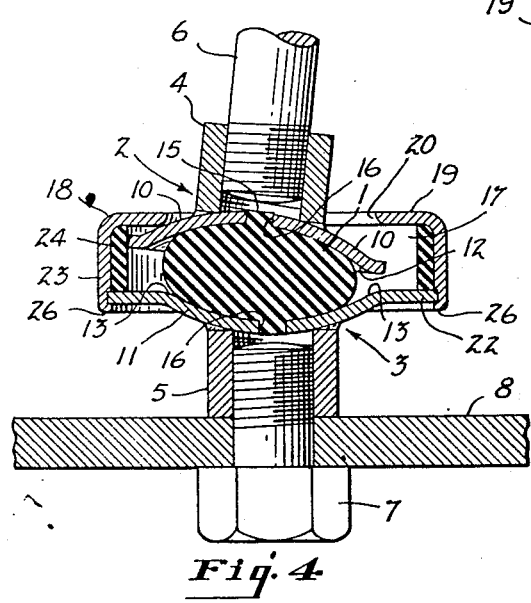
Fig. 4 is a longitudinal sectional view of the mounting shown in Figs. 1 and 2, showing the portions of the parts when the applied load is not entirely vertical or when the supported body is subjected to angular vibration.

A bumper such as a rubber annulus 24 is suitably disposed over portions of the inner face of the axially extending portion 23 of the cup-shaped retaining member 18, i. e., around portions of the periphery of the inner annular channel 17, to serve as a bumper or shock-absorber should the lateral thrust between the mounting and mounted members become so great that the peripheral portion of the disclike portions 10 tends to contact the axially extending surface of the channel 17, as shown in Fig. 4. The cup-shaped portion 18 of the locking means is assembled on the annular extending portions 22 of the transverse portion 11 of greatest diameter after the bearing surfaces 12 and 13 of the portions 10 and 11 have been placed in contact with the resilient member 1. The portions 26 are turned over the peripheral portion 23 after assembly, as is evident from the drawing.

Figure 3:
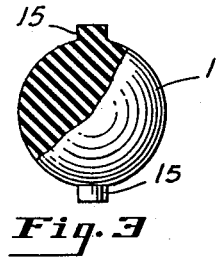
Fig. 3 is an elevational view of a resilient stress-supporting member of the mounting of Fig.1 when in an undeformed or molded state.
Figure 5:
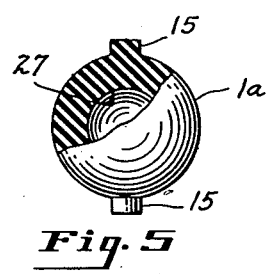
Fig. 5 is a plan view, with portions broken away, of a modified form of resilient member that may be substituted for the resilient member shown in Figs. 1, 2 and 3.
Figure 2:
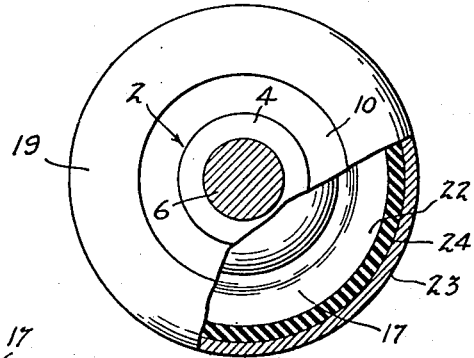
Fig. 2 is a plan view, with portions broken away of a mounting shown in Fig .1 as viewed from line 2—2 of Fig. 1.

The resilient member 1 may be solid, as shown in Figs. 1 to 3, or it may have central portions removed, as shown in Fig. 5, to form the member 1a with a cavity 27, which may be filled with gas or other fluid, as desired.

The characteristics of the mounting may be substantially varied by the use of a gas or a liquid-filled (preferably containing fluid such as glycerol or other liquid insoluble in the rubbery material) hollow sphere, as shown in Fig. 5, in place of the solid sphere or spheroidal member, as shown in Figs. 1 to 4, inclusive.

It will be seen that the mountings of the present invention are extremely simple to fabricate; they permit movement in several directions and yet give the advantages had by rubber under initial compression. The degree of initial compression may be regulated by varying the free axial space between the flanges 13 and 22 of the channel 17 with reference to the molded diameter of the ball or clock 1. In general initial compression from the molded state of at least 15% or 20% is desired.

It is understood that variations and modifications of the invention herein shown and described may be made without departing from the spirit of the invention.

What I claim is:

1. A vibration-damping connection comprising two rigid connectors, each having attaching means for attachment to one of two relatively vibratable members and a rigid disclike transverse portion with a centrally disposed bearing surface, said connectors being arranged with said bearing surfaces directed toward each other, a mass of separately formed, soft vulcanized rubberlike material disposed between said bearing surfaces with one of two opposite sides of said mass bearing against each of said bearing surfaces, and a retaining member carried by one of said disc-like portions and forming therewith an annular inwardly facing channel in which the peripheral edge of the other disc-like portion is movably retained, whereby maximum separation of the disc-like portions is limited by the width of said channel and minimum separation is limited by the resistance and thickness of said resilient member, the area of said bearing surfaces being greater than the initial area of contact of said resilient mass thereon.

2. A vibration-damping connection comprising two rigid connectors, each having attaching means for attachment to one of two relatively vibratable members and a rigid disclike transverse portion with a centrally disposed generally concave bearing surface, said connectors being arranged with said bearing surfaces directed toward each other, a mass of separately formed, soft vulcanized rubberlike material disposed between said bearing surfaces with one of two opposite sides of said mass bearing against each of said bearing surfaces, and a retaining member carried by one of said disc-like portions and forming therewith an annular inwardly facing channel in which the peripheral edge of the other disc-like portion is movably retained, said connectors being relatively movable only through distortion of said mass of soft rubberlike material whereby maximum separation of the disclike portions is limited by the width of said channel and minimum separation is limited by the resistance and thickness of said resilient member, the area of said bearing surfaces being greater than the initial area of contact of said resilient mass thereon.

3. A vibration-damping connection comprising two rigid connectors, each having attaching means for attachment to one of two relatively vibratable members and a rigid disclike transverse portion with a centrally disposed generally concave bearing surface, said connectors being arranged with said bearing surfaces directed toward each other, a mass of separately formed, soft vulcanized rubberlike material having generally convexly curved surfaces, disposed between said bearing surfaces with one of two opposite sides of said mass bearing against each of said bearing surfaces, one of the interface forming members that form each interface between the bearing surface and said mass of rubberlike material being provided with a lug and the other being provided with an opening to receive said lug, and a retaining member carried by one of said disc-like portions and forming therewith an annular inwardly facing channel in which the peripheral edge of the other disc-like portion is movably retained, said connectors being relatively movable only through distortion of said mass of soft rubberlike material, whereby maximum separation of the disclike portions is limited by the width of said channel and minimum separation is limited by the resistance and thickness of said resilient member, the area of said bearing surfaces being greater than the initial area of contact of said resilient mass thereon.

4. A vibration-damping connection comprising two rigid connectors, each having attaching means for attachment to one of two relatively vibratable members and a rigid disclike transverse portion with a centrally disposed generally concave bearing surface, said connectors being arranged with said bearing surfaces directed toward each other, a mass of separately formed, soft vulcanized rubber-like material having generally convexly curved surfaces, disposed between said bearing surfaces with one of two opposite sides of said mass bearing against each of said bearing surfaces, said resilient mass being provided with a lug at opposite sides thereof and said connection at the bearing surfaces thereof being provided with an opening to receive said lug, and locking means having an inwardly opening channel therein, said locking means being carried by one of said disclike portions and having peripheral edge portions of the other of said disclike portions movably retained within the channel thereof, said connectors being relatively movable only through distortion of said mass of soft rubberlike material, whereby maximum separation of the disclike portions is limited by the width of said channel and minimum separation is limited by the resistance and thickness of said resilient member, the area of said bearing surfaces being greater than the initial area of contact of said resilient mass thereon.

5. A vibration-damping support comprising two rigid connectors, each having a tubular portion for attachment to one of two relatively vibratable members, and extending generally transverse to the axis of said tubular portion and at one end portion thereof a rigid generally disc-shaped portion, said disc-shaped portion of each of said rigid connectors having portions extending generally transversely beyond the side edges of said tubular portion and having a concavely curved bearing surface extending generally transversely to the axis of said tubular portions and free of contact with said tubular portions, said connectors being arranged with said concavely curved bearing surfaces facing toward each other, a spheroidally curved mass of soft vulcanized rubberlike material disposed between said bearing surfaces with one of two opposite sides of said mass bearing against each of said bearing surfaces, said mass permitting relative movement of said bearing surfaces only through deformation thereof and preventing contact of said bearing surfaces, and locking means having a channel with an inwardly opening groove, said channel being carried by one of said disclike portions and having peripheral edge portions of the other disclike portion movably retained within the channel thereof, whereby maximum separation of the disclike portions is limited by the width of said channel and minimum separation is limited by the resistance and thickness of said resilient member, the area of said bearing surfaces being greater than the initial area of contact of said resilient mass thereon.

6. A vibration-damping support comprising two rigid connectors, each having a tubular portion for attachment to one of two relatively vibratable members, and extending generally transverse to the axis of said tubular portion and at one end portion thereof a rigid generally disc-shaped portion, said disc-shaped portion of each of said rigid connectors having portions extending generally transversely beyond the side edges of said tubular portion and having a concavely curved centrally disposed bearing surface extending generally transversely to the axis of said tubular portions and free of contact with said tubular portions, said connectors being arranged with said concavely curved bearing surfaces facing toward each other, a mass of soft vulcanized rubberlike material disposed between said bearing surfaces with one of two opposite sides of said mass bearing against each of said bearing surfaces, said mass permitting relative movement of said bearing surfaces only through deformation thereof and preventing contact of said bearing surfaces, and locking means having a channel carried by one of said disclike portions and having peripheral edge portions of the other disclike portion movably retained within said channel, whereby maximum separation of the disclike portions is limited by the width of said channel and minimum separation is limited by the resistance and thickness of said resilient member, the area of said bearing surfaces being greater than the initial area of contact of said resilient mass thereon.

7. A vibration-insulating mounting comprising two rigid connectors each having attaching means for attachment to a different one of two relative vibratable members and a transverse portion with a transversely extending bearing surface and of greater diameter than the diameter of said attaching means, said connectors being arranged with said bearing surfaces facing each other, a mass of resilient material having a spheroidally curved surface between said bearing surfaces, said transverse portion on one of said rigid connectors being of greater diameter than said transverse portion of the other, a cup-shaped flanged member having a central opening therethrough of lesser diameter than the diameter of the smaller of said transverse portions and having said attaching means of the member having the smaller of said transverse portions extending therethrough, said cup-shaped flanged member being carried by peripheral portions of said transverse member of greatest diameter so as to cooperate therewith to form an inwardly opening channel, peripheral portions of said transverse portion of smallest diameter being disposed within said channel formed by co-action of said flanged member and portions of said transverse portion of greatest diameter, whereby maximum separation of the disclike portions of said connectors is limited by the width of said channel, and minimum separation is limited by the resistance and thickness of said resilient member, said connectors being relatively movable only through distortion of said mass of resilient material.

8. A vibration-insulating mounting comprising two rigid connectors each having attaching means for attachment to a different one of two relative vibratable members and a transverse portion with a transversely extending bearing surface and of greater diameter than the diameter of said attaching means, said connectors being arranged with said bearing surfaces facing each other, a mass of resilient material having a spheroidally curved surface between said bearing surfaces, said transverse portion on one of said rigid connectors being of greater diameter than said transverse portion of the other, a cup-shaped flanged member having a central opening therethrough of lesser diameter than the diameter of the smaller of said transverse portions and having said attaching means of the member having the smaller of said transverse portions extending therethrough, said cup-shaped flanged member being carried by peripheral portions of said transverse member of greatest diameter so as to cooperate therewith to form an inwardly opening channel, peripheral portions of said transverse portion of smallest diameter being disposed within said channel formed by co-action of said flanged member and portions of said transverse portion of greatest diameter, whereby maximum separation of the disclike portions of said connectors is limited by the width of said channel, and minimum separation is limited by the resistance and thickness of said resilient member, said connectors being relatively movable only through distortion of said mass of resilient material, side edges of said channel being spaced to always maintain said resilient member under compression.

9. The combination of a mounted member, a mounting member and a vibration-damping connection comprising two rigid connectors, each having attaching means connected to one of said mounting and mounted members, and a rigid disclike transverse portion with a centrally disposed bearing surface, said connectors being arranged with said bearing surfaces directed toward each other, a mass of separately formed, soft vulcanized rubberlike material disposed between said bearing surfaces with one of two opposite sides of said mass bearing against each of said bearing surfaces, and a locking member having a channel carried by one of said disclike portions and having peripheral edge portions of the other of said disclike portions movably retained within the groove thereof, whereby maximum separation of the disclike portions is limited by the width of said channel and minimum separation is limited by the resistance and thickness of said resilient member, the area of said bearing surfaces being greater than the initial area of contact of said resilient mass thereon.

10. A vibration-damping connection comprising two rigid connectors, each having attaching means for attachment to one of two relatively vibratable members and a rigid disclike transverse portion with a centrally disposed generally concave bearing surface, said connectors being arranged with said bearing surfaces directed toward each other, a mass of separately formed, soft vulcanized rubberlike material having generally convexly curved surfaces disposed between said bearing surfaces with one of two opposite sides of said mass bearing against each of said bearing surfaces, indexing locating means for fixing the surface portions of said resilient mass in contact with said concave surface of at least one of said disclike portions, and a retaining member carried by one of said disclike portions and forming therewith an annular inwardly facing channel in which the peripheral edge of the other disclike portion is movably retained, said connectors being relatively movable only through distortion of said mass of soft rubberlike material whereby maximum separation of the disclike portions is limited by the width of said channel and minimum separation is limited by the resistance and thickness of said resilient member, the area of said bearing surfaces being greater than the initial area of contact of said resilient mass thereon.

11. A vibration-damping connection according to claim 10 further characterized in that said channel contains a bumper of resilient material which bumper is separate from said mass of vulcanized rubberlike material and is adapted to contact a peripheral edge of the disclike portion that is movably retained within said inwardly facing channel upon relatively large deflections of said vibration-damping connection.

ELDON PAUL NEHER.

REFERENCES CITED

The following references are of record in the file of this patent:

UNITED STATES PATENTS

| Number | Name | Date |
|---|---|---|
| 2,079,798 | Geyer | May 11, 1937 |
| 2,357,120 | Kuebert et al. | Aug. 29, 1944 |
| 2,430,709 | Devorss | Nov. 11, 1947 |

FOREIGN PATENTS

| Number | Country | Date |
|---|---|---|
| 15,560 | Great Britain | July 5, 1913 |